(12) United States Patent
Fujimura

(10) Patent No.: US 6,697,997 B1
(45) Date of Patent: Feb. 24, 2004

(54) RECORDING MEDIUM WITH A SIGNED HYPERTEXT RECORDED THEREON SIGNED HYPERTEXT GENERATING METHOD AND APPARATUS AND SIGNED HYPERTEXT VERIFYING METHOD AND APPARATUS

(75) Inventor: Ko Fujimura, Yokohama (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/366,215

(22) Filed: Aug. 2, 1999

(30) Foreign Application Priority Data

Aug. 12, 1998 (JP) .......................................... 10-228233

(51) Int. Cl.[7] .............................. H04K 1/00; G06F 11/00
(52) U.S. Cl. .............................. 715/501; 705/54; 705/3; 705/64; 705/75; 705/58; 705/59; 713/156; 713/157
(58) Field of Search ................................ 707/513, 501; 705/54, 3, 64, 6, 21, 57, 58, 59; 715/513, 501; 713/156, 157

(56) References Cited

U.S. PATENT DOCUMENTS

| | | | |
|---|---|---|---|
| 5,465,299 A | * 11/1995 | Matsumoto et al. | 713/176 |
| 5,615,268 A | * 3/1997 | Bisbee et al. | 713/176 |
| 5,634,054 A | * 5/1997 | Sarachan | 707/100 |
| 5,809,144 A | 9/1998 | Sirbu et al. | |
| 5,845,281 A | * 12/1998 | Benson et al. | 707/9 |
| 5,892,900 A | * 4/1999 | Ginter et al. | 713/200 |
| 5,905,860 A | * 5/1999 | Olsen et al. | 713/201 |
| 6,088,707 A | * 7/2000 | Bates et al. | 707/501.1 |
| 6,226,618 B1 | * 5/2001 | Downs et al. | 705/1 |
| 6,263,432 B1 | * 7/2001 | Sasmazel et al. | 713/100 |

FOREIGN PATENT DOCUMENTS

| | | |
|---|---|---|
| EP | 0 632 415 A1 | 1/1995 |
| EP | 0 738 058 A2 | 10/1996 |
| EP | 0 880 254 A2 | 11/1998 |
| GB | 2 301 919 A | 12/1996 |
| WO | WO 96/24997 | 8/1996 |

OTHER PUBLICATIONS

Fujimura, Ko, et al., "General–purpose Digital Ticket Framework," Proceedings of the 3rd USENIX Workshop on Electronic Commerce, Boston, Mass., Aug. 31–Sep. 3, 1998.

International Search Report dated Jun. 19, 2001, Application No. 9903729–3, pp. 1–2.

Okamoto et al., "ESIGN: An Efficient Digital Signature Scheme", NTT Review, vol. 3, No. 4, Jul. 1991, pp. 98–106.

(List continued on next page.)

*Primary Examiner*—Stephen S. Hong
*Assistant Examiner*—Matthew Ludwig
(74) *Attorney, Agent, or Firm*—Connolly Bove Lodge & Hutz LLP

(57) ABSTRACT

In a hypertext made up of a plurality of linked documents, each document is composed of a document ID, an issuer ID, a property definition, and a signature attached to the document in its entirety. The property definition includes a property name 402, a value 403, a destination document ID 404, and a constraint definition part 405. By setting in the constraint definition part 405 a hash constraint 406 on the destination document 410, a schema ID constraint 407 defining the document type of the document 410, and a constraint 408 restricting the value of a particular property of the document 410, it is possible to make alterations in the contents of a signed document or attach a document and to prevent invalid alterations in the document contents or invalid attachment of a document.

22 Claims, 9 Drawing Sheets

OTHER PUBLICATIONS

A. Herzberg et al., "Surf'N'Sign: Client Signatures On Web Documents", IBM Systems Journal, vol. 37, No. 1, 1998, pp. 61–71.

Arimura et al., "Report on CeBIT'91 Exhibition", NTT Review, vol. 3, No. 4, Jul. 1991, pp. 107.

"ESIGN: An Efficient Digitial Signature Scheme" Tatsuaki Okamoto, Atsushi Fujioka and Masahiko Iwata, NTT Review, Jul. 3, 1991.

"Surf'N'Sign: Client signatures on Web documents" A. Herzberg, D. Naor, IBM Systems Journal, 1998.

* cited by examiner

FIG. 6

600 PLANE TICKET

| PROPERTY | | | VALUE (EXAMPLE) | |
|---|---|---|---|---|
| SCHEMA ID | | | http://a-airline.co.jp/air-ticket | 601 |
| DOCUMENT ID | | | BsW3a24u2L3e2XsI9fyo9wLi8 | 602 |
| ISSUER ID | | | 3a2Bfyo9w8sLiW4u2L3e2XsI9 | 603 |
| BODY | RIGHT TYPE | | PLANE TICKET | 604 |
| | DEPAR DATE | | 1998-03-03 | 605 |
| | FLIGHT NO. | | AL803 | 606 |
| | DEPARTURE | | TOKYO | 607 |
| | DESTINATION | | LONDON | 608 |
| | ISSUER ID | VALUE | 4u2L3e2XsI9o9w8sL3a2BiWfy | 609 |
| | | DESTI DOC ID | fyo9w8sLiu23aW42BL3esI92X | 610 |
| | | CONSTRAINTS SCHE ID CON | #SysValue (VAL CHANGE CERTIFI) | 611 |
| | | CONSTRAINTS PROP VAL CON | ISSUER ID = 4u2L3e2XsI9o9w8sL3a2BiWfy | 612 |
| ISSUER SIG | | | 1Afyo9we23aXsI8sLiWoubL39 | 613 |

FIG. 7

700 VALUE CHANGE CERTIFICATE

| PROPERTY | | | VALUE (EXAMPLE) | |
|---|---|---|---|---|
| SCHEMA ID | | | #SysValue | 701 |
| DOCUMENT ID | | | fyo9w8sLiu23aW42BL3esI92X | 702 |
| ISSUER ID | | | 4u2L3e2XsI9o9w8sL3a2BiWfy | 703 |
| BODY | NEW VAL | VALUE | sI9o9w8syL3a4u2L3eBiW2X2f | 704 |
| | | DESTI DOC ID | s9w8iW4u2L3e2XsI9L3a2Bfyo | 705 |
| | | CONSTRAINTS SCHE ID CON | #SysValue (VAL CHANGE CERTIFI) | 706 |
| | | CONSTRAINTS PROP VAL CON | ISSUER ID = sI9o9w8syL3a4u2L3eBiW2X2f | 707 |
| | NEW DATE | | 1998-04-04 | 708 |
| ISSUER SIG | | | 9we2ou1AfyobL393aXsI8sLiW | 709 |

FIG. 8

800  PLANE TICKET SCHEMA

| PROPERTY | | VALUE (EXAMPLE) | |
|---|---|---|---|
| META-SCHEMA ID | | #System | 801 |
| META-SCHE DEFINER ID | | w8sLiWoubLe23aXsI391Afyo9 | 802 |
| SCHEMA ID | | http://a-airline.co.jp/air-ticket | 803 |
| ISSUER ID | | #ExactlyOne | 804 |
| BODY | RIGHT TYPE | PLANE TICKET | 805 |
| | DEPAR DATE | #ExactlyOne | 806 |
| | FLIGHT NO. | #ExactlyOne | 807 |
| | DEPARTURE | #ZeroOrOne | 808 |
| | DESTINATION | #ZeroOrOne | 809 |
| | OWNER ID | #ExactlyOne | 810 |
| SCHE DEFINER SIG | | 8sLi1AfyWowe23aXsIo9ubL39 | 811 |

FIG. 9

900  VALUE CHANGE CERTIFICATE SCHEMA

| PROPERTY | | VALUE (EXAMPLE) | |
|---|---|---|---|
| META-SCHEMA ID | | #System | 901 |
| META-SCHE DEFINER ID | | bLe23aw8sLiWouXsI3o991Afy | 902 |
| SCHEMA ID | | #SysValue | 903 |
| ISSUER ID | | #ExactlyOne | 904 |
| BODY | NEW VALUE | #ExactlyOne | 905 |
| | NEW DATE | #ExactlyOne | 906 |
| SCHE DEFINER SIG | | we23aXsI8sLi1AfyWoo9ubL39 | 907 |

| SIGNED DOCUMENT | PROP OF ATTACHED OBJECT | CON OF ATTACHED SIGNED DOC | |
|---|---|---|---|
| BILL, BEER COUPON, BOOK COUPON, STOCK | OWNER | SPECIFY TRANSFER CERTIFICATE & ISSUER (CURRENT OWNER) | 1101 |
| OPEN PLANE TICKET | RESERVA STATUS | SPECIFY RESERVATION TICKET TYPE & ISSUER | 1102 |
| ON-CREDIT RESERVATION TICKET | PAYMENT STATUS | SPECIFY CHECK | 1103 |
| SETTLEMENT DOC | SETTLE STATUS | SPECIFY SEALER | 1104 |
| CONTRACT | REVENUE STAMP | SPECIFY REVENUE STAMP | 1105 |
| STAMP RALLY PAPERBOARD POINT-CARD PAPERBOARD | SEAL | SPECIFY STAMP TYPE AND SEALER | 1106 |
| CONCERT TICKET | PROVISION INFOR | SPECIFY HASH VALUE | 1107 |

# RECORDING MEDIUM WITH A SIGNED HYPERTEXT RECORDED THEREON SIGNED HYPERTEXT GENERATING METHOD AND APPARATUS AND SIGNED HYPERTEXT VERIFYING METHOD AND APPARATUS

BACKGROUND OF THE INVENTION

The present invention relates to a system for electronically circulating various documents necessary for business transactions and, more particularly, to a method and apparatus for secure circulation of electronic tickets, electronic certificates and similar documents whose description contents change while in circulation.

With the recent expansion of electronic commerce, the electronic cash, electronic tickets, electronic certificates, purchase and order slips, and so forth have come to be exchanged between the participants of transactions over networks. To circulate such documents over the Internet or similar networks shared by an indefinite number of people, it is necessary to protect the documents from fraud, for example, alterations in the documents, wiretapping and impersonation. Typical technologies that have been proposed to prevent fraud are digital signature schemes such as the RSA scheme by RSA Data Security Inc. and ESIGN by Nippon Telegraph and Telephone Corporation. With the digital signature (hereinafter referred to simply as a signature) scheme, a signer encrypts a document using a secret key which no one but the signer knows and the recipient of the document decrypts it using a public key corresponding to the secret key, thereby verifying that the document has been duly signed by the signer himself and has not been altered.

However, since a change in the contents of a signed document breaks the signature, some contrivance is needed in the application of the digital signature scheme to a document, for example, an electronic ticket whose properties, such as a reservation status, a payment status and the ticket owner's identification, change dynamically while in circulation. In a simple scheme, as depicted in FIG. 1, upon each occurrence of a change, the document to be changed is attached with change information describing which property has been changed to what contents, and the document is signed again in its entirety. In FIG. 1 the arrows each indicate the scope of application of the signature. That is, an issuer signature 103 is attached to an issuer ID 101 and the main body 102, and then a changer-1 signature 106 is attached to the issuer ID 101, the main body 102 and the issuer signature 103, a changer-1 ID 104 and change information 105. In this way, upon each occurrence of a change, all pieces of information attached to the document so far, a changer-n ID 107 and change information n are attached with a changer-n signature 109.

With such a scheme, however, all pieces of the change information 1 (105), . . . , the change information n (108) need to be analyzed to obtain an ultimate or up-to-date value for a certain property of the main body 102—this involves complex processing. Moreover, the multiple signatures attached to the document inevitably raise signature processing costs.

Furthermore, not everybody is usually allowed to freely change the properties or attributes of an electronic ticket, contract document or the like, but it may sometimes be desirable that the ticket or document be changed only by persons of particular capabilities; for example, the changer of a reservation status, payment status, or the owners is limited specifically to an issuer, a bank, or an agent, respectively. No general-purpose scheme for such capability control has been studied.

Moreover, an electronic ticket, contract or similar document is sometimes attached with another document while in circulation, and it may be desirable to limit the document to be attached to a particular type of document; for example, the change of the reservation status, payment status, or the owner need to be attached with a reservation ticket, a check, or transfer certificate, respectively. No general-purpose scheme for such control has been studied yet.

As described above, there has not been available any general-purpose scheme for allowing only a person of a particular capability to change a particular field or property of a document nor has there been available any general-purpose scheme for attaching only a particular kind of document to the original one; hence, in the case of circulating a document requiring such control, it has been necessary to develop special software for each application or for each kind of document to be circulated. And, to refer to an ultimate or up-to-date value of a document having a property that is changed while in circulation and signed for preventing alterations, all pieces of change information must be analyzed, giving rise to the problem of involving complex processing.

SUMMARY OF THE INVENTION

It is therefore an object of the present invention to provide a recording medium having recorded thereon a signed hypertext capable of defining diverse capabilities of changing respective properties in a document, a recording medium having recorded thereon a hypertext capable of defining the type of document to be attached, a method for changing each property value or attaching a document, and a general-purpose method and apparatus for detecting a fraudulent or malicious alterations or attachment of a document.

According to a first aspect of the present invention, there is provided a recording medium having recorded thereon a hypertext made up of a plurality of linked documents, wherein:

at least one of said plurality of linked documents making up said hypertext comprises an identifier of said at least one document, an identifier of its issuer, at least one property definition part, and an issuer signature attached to said at least one document in its entirety; and said at least one property definition part includes the value of the property defined therein, an identifier of a document located at the destination of the link (hereinafter referred to as a destination document), and a constraint definition part for defining constraints on said destination document.

In the recording medium with the signed hypertext recorded thereon, the constraint on the link-destination document may be a schema which defines its document type.

In the recording medium with the signed hypertext recorded thereon, the constraint on the destination document may be the value of a particular one of its properties.

In the recording medium with the signed hypertext recorded thereon, the constraint on the destination document may be its hash value.

According to a second aspect of the present invention, there is provided a method for creating a hypertext made up of a plurality of linked documents, which comprises the steps of:

(a) forming at least one of said plurality of linked documents by an identifier of said at least one document, an identifier of its issuer, at least one property definition part for defining the value of a property of said at least one document, and an issuer signature attached to said at least one document in its entirety;

(b) incorporating into said at least one property defining part, if it has a link, an identifier of a destination document and a constraint defining part for defining a constraint on said destination document;

(c) generating a unique document identifier for a document not yet instantiated at the destination of the link at the time of creating a source document, and incorporating said unique destination document identifier, as an identifier of a future destination document, in said at least one property definition part of said source document; and (d) generating said destination document with said unique document identifier when the body of said destination document is instantiated.

According to a third aspect of the present invention, there is provided a method for verifying the validity of the signed hypertext which comprises the steps of:

(a) verifying whether said destination document satisfies said constraint defined in a source document which is said at least one document; and (b) verifying the validity of an issuer signature of each document making up the hypertext.

According to a fourth aspect of the present invention, there is provided an apparatus for generating a signed hypertext of the above structure when a document at the destination of the link has not been instantiated at the time of defining a source document, which comprises:

means for generating a unique document identifier for a yet-to-be instantiated document;

means for storing therein said unique document identifier as an identifier of a future destination document to generate the source document; and means for generating said document at the destination of the link with said unique document identifier when said destination document is instantiated, said instantiated document being linked as the destination document to said source document.

According to a fifth aspect of the present invention, there is provided an apparatus for verifying the validity of the signed hypertext of the above structure, which comprises:

means for verifying whether the identifier of a destination document is the same as a destination document identifier defined in a source document;

means for verifying whether the destination document satisfies the constraint defined in the source document; and means for verifying the validity of the issuer signature of each document making up the hypertext.

BRIEF DESCRIPTION OF THE DRAWINGS

FIG. 6 is a diagram showing an example of the definition of a plane ticket represented by a signed document with an incomplete link defined for an owner ID property;

FIG. 7 is a diagram showing an example of the definition of a value-change certificate represented by a signed document, which certificate is attached to a link added to the owner ID property in FIG. 6;

FIG. 8 is a diagram depicting an example of the schema definition of the plane ticket shown in FIG. 6;

FIG. 9 is a diagram depicting an example of the schema definition of the value-change certificate shown in FIG. 7;

FIG. 11 is a table showing examples of the relationships of signed documents, properties to be attached thereto and constrains on the signed documents;

DETAILED DESCRIPTION OF THE PREFERRED EMBODIMENTS

A detailed description will be given, with reference to the accompanying drawings, of embodiments of the present invention.

Figure 1:
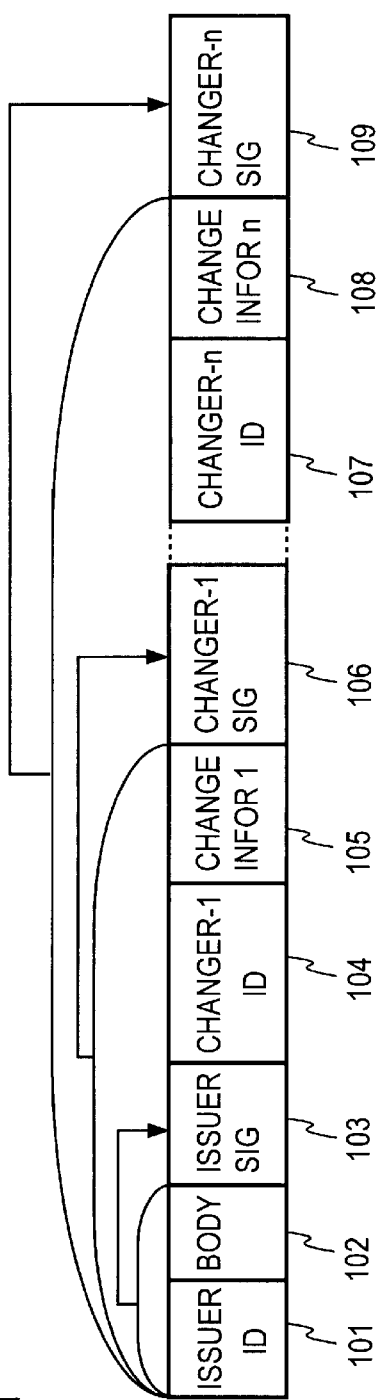
FIG. 1 is a diagram showing an example of a conventional signed document changing method.
Figure 2:
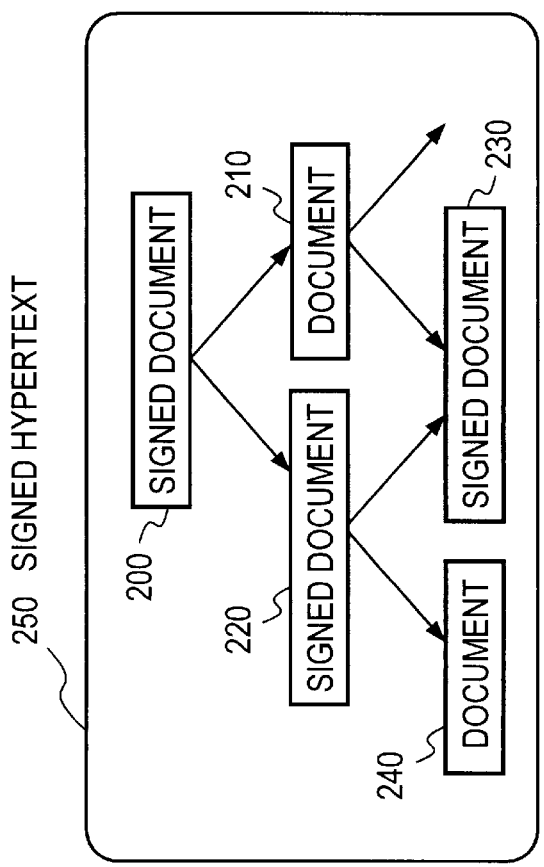
FIG. 2 is a block diagram illustrating the entire configuration of a signed hypertext.

FIGS. 2 to 4B illustrate the configuration of a signed hypertext 250 according to an embodiment of the present invention. The signed hypertext 250 comprises, as depicted in FIG. 2, a linked set of, for example, HTML or XML hypertext documents 200 to 240. At least the document 200 located at the root of the link (which document will hereinafter referred to as a root document) is a signed document. The document located at each destination of the link (hereinafter referred to as a destination document) except the root document may be signed (220, 230) or unsigned (210, 240). And the documents may each have different destinations. In the example of FIG. 2, the document 210 has the document 230 at one destination of the link but no document at the other destination—this indicates that a document may be located there in the future.

Figure 3:
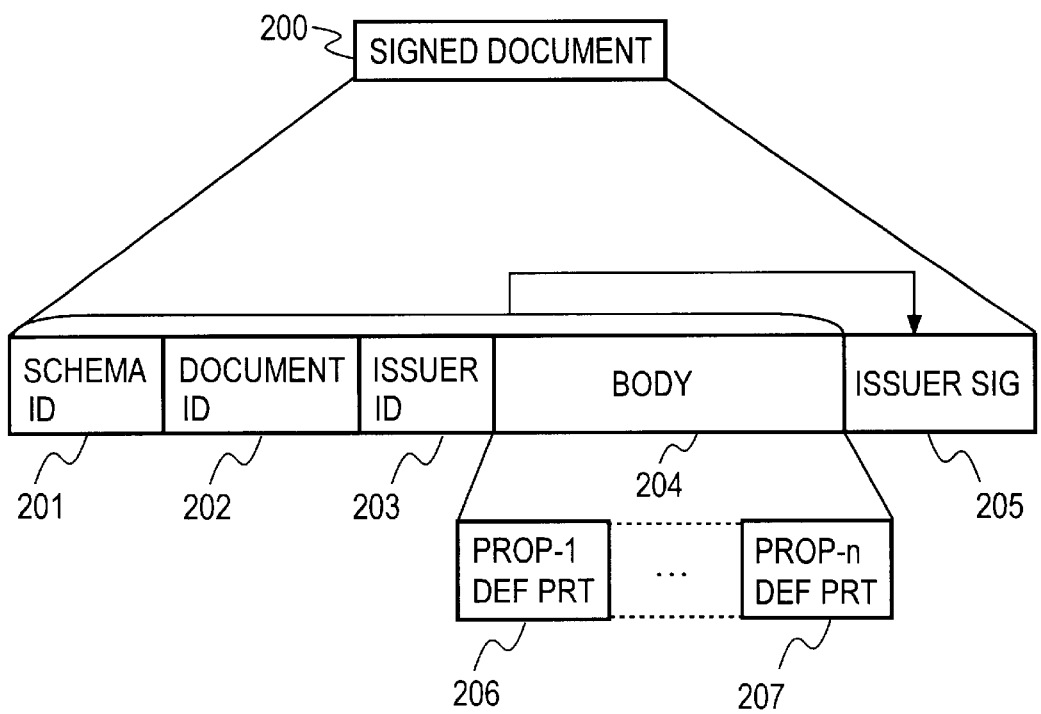
FIG. 3 is a diagram showing the data structure of a signed document that is a constituent of the signed hypertext.

As depicted in FIG. 3, one signed document 200 is made up of a schema ID 201, a document ID 202, an issuer ID 203, the main body 204 and an issuer's signature attached thereto in their entirety. However, for example, as in the case of the document 210, when its contents are protected from alterations by virtue of a hash constraint specified by another signed document 200, or when alterations in the contents of the document 210 are controlled by other means such as access control of a server, the prevention of alterations by the signature is not necessary. In such an instance, the issuer ID (corresponding to 203) and the issuer's signature corresponding to 205) of the document 210 may be omitted. The schema ID 201 is an identifier of a schema definition that specifies the structure (format) of the signed document 200. When there is no constraint on the document type, or when the schema ID is specified by a schema constraint specified by a different signed document as described later on, the schema ID is available, so that the schema ID 201 may also be omitted. The document ID 202 is an identifier of the signed document 200 and is provided in manner to be unique among all the documents concerned. In some cases, the document ID 202 may also be omitted as described later on. The issuer ID 203 is an identifier of a person or organization who signs the document.

Figure 4A:
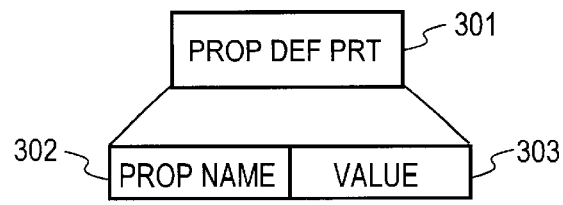
FIG. 4A is a diagram depicting the data structure of a property definition part with no link.

The main body 204 is composed of one or more property definition parts 206 and 207. These property definition parts are each formed by a tuple of property name 302 and value 303 as depicted in FIG. 4A, or a quadruplet of property name 402, value 403, destination document ID 404 and constraint definition part 405 as depicted in FIG. 4B.

For example, the signed document 200 is a concert ticket, the property names 302 and 402 are category names such as the "date for the concert" and the "site for the concert", and the values 303 and 403 are concrete values which specify the contents of the categories, such as "1998-03-03" and "New York City Hall". The destination document ID 404 is an identifier of a signed document located at the destination of the link. The constraint definition part 405 is a constraint for restricting the structure of the destination document or its property value, which will be described later in detail. When the property definition part 301 is made up of the property name 302 and the value 303 as shown in FIG. 4A, the value of the property represented by the property name 302 is interpreted as the value 303.

Figure 4B:
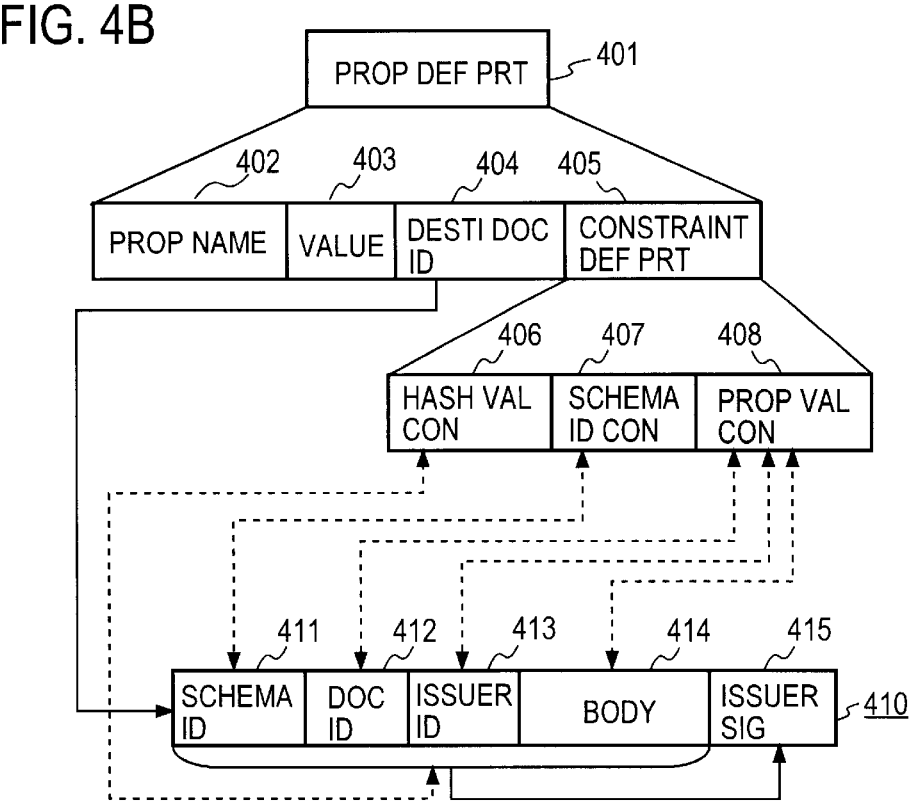
FIG. 4B is a diagram depicting the data structure of a property definition part with a link and the relationship between the property definition part and a signed destination document in terms of constraints.

When the property definition part 301 is formed by a quadruplet of property name 402, value 403, destination document ID 404 and constraint definition part 405 as shown in FIG. 4B, the interpretation of the property value differs depending on whether or not a document is located at the destination of the link which is referred to by the destination document ID 404. That is, when no document 410 is located at the destination of the link referred to by the destination document ID 404 (The link in this case will hereinafter be called an incomplete link.), the value 403 is interpreted as the value of the property represented by the property name. When the document 410 is located at the destination of the link referred to by the destination document ID 404 (The link in this case will hereinafter be called a complete link.) and if the document 410 satisfies the constraint defined in the constraint definition part 405, the main body 414 of the destination document 410 is interpreted as the value of the property represented by the property name 402. When the document 410 is located at the destination of the link referred to by the destination document ID 404 but does not satisfy the constraint defined in the constraint definition part 405, the signed hypertexts 200 and 410 are regarded as invalid. Incidentally, the plurality of property definition parts 206 and 207 may have different destinations.

If the destination document is not instantiated at the time of generating the document from which the link branches off (which document will hereinafter be referred to as a source document), a unique document ID for the destination document is generated in advance and is stored as a future destination document ID 404 in the source document, which is then signed. And when the main body (value) 414 of the destination document 410 is instantiated, the document 410 having the instantiated main body 414 is generated as a document of a document ID 412 specified by the aforementioned destination document ID 404.

The constraints in the constraint definition parts 405 are, in this embodiment, a hash value constraint 406, a schema ID constraint 407 and a property value constraint 408 as described below, but various other constraints, such as the specifying of the range and type of each property value or the relationship between the property values in terms of magnitude, may be defined in the constraint definition part 405.

The hash value constraint 406 is used to prevent an invalid substitution of the destination document 410 when it has been completely established at the time of generating the source document. The hash value is generated for a set of schema ID 411, document ID 412, issuer ID 413 and main body 414 of the destination document 410, and the hash value is defined as one of the constraints which are defined in the constraint definition part 405 of the property definition part 401 in the source signed document 200. Furthermore, the document ID 412 of the destination document 410 is defined as the destination document ID 404 of the source signed document 200. With this scheme, it is possible to detect an invalid substitution of the destination document 410 with a document prepared for a different purpose, because the hash value constraint is not satisfied. Moreover, the provision of the hash value constraint ensures the detection of an invalid alteration in the destination document, since the hash value constraint is not satisfied in the case of an invalid alteration, either. Hence, when this constraint is provided as referred to above, the issuer signature 415 of the destination document 410 can be omitted. A variety of methods have been proposed to generate the hash value; for example, the MD5 scheme by RSA Data Security Inc. or the like can be used. Incidentally, it is disclosed in Ross J. Anderson, et al., "The Eternal Resource Locator: An Alternative Means of Establishing Trust on the World Wide Web," 3rd USENIX Workshop on Electronic Commerce, August–3 31 September 1998, that catalog lists of medical information prepared and updated by doctors in respective areas of specialty were made public as an HTML document on the World Wide Web and that the hash value of each list was provided at the destination of the link to prevent the destination document from being altered. The present invention enables the destination document to be restricted by diverse constraints as well as the hash constraint.

Alternatively, the provision of a unique identifier generated by the same method as that for the document ID may be specified as a constraint on a particular property in the destination document. This also prevents the substitution of the destination document with a signed document generated for a different purpose. Accordingly, in this case, the signed document is not always required to have the document ID 412 as depicted in FIG. 4B.

The schema ID constraint 407 and the property value constraint 408 are used to limit the issuer, other property value of the destination document, or the document structure in the case where no document is instantiated at the destination of the link when the source document is generated.

The schema ID constraint 407 is a constraint that requires the schema ID 411 of the destination document not only to match the constraint 407 itself but also to be consistent with the schema which is referred to by the schema ID (the latter requirement being the presence of a specified number of values in each property as described with reference to FIG. 8, for instance). Accordingly, the verification of this consistency requires the derivation of the schema definition from the schema ID, and this can be done using, for example, a method which specifies the schema ID using Universal Resource Identifier (URI) or the like specified by the World Wide Web Consortium (W3C) and obtains the schema definition placed on a network using the HTTP protocol specified by IETF. A schema definition expected to use can be obtained on an off-line basis by placing a cache memory locally in the server or terminal.

Figure 5:
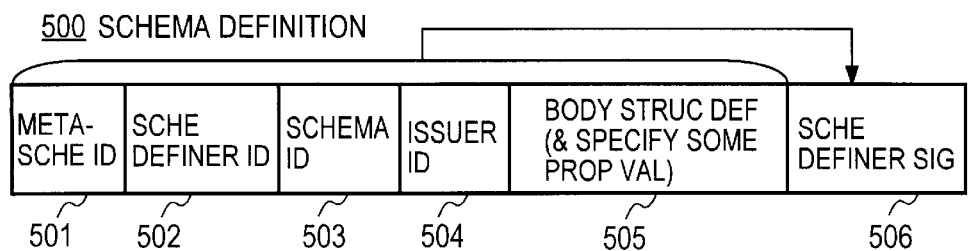
FIG. 5 is a diagram depicting the data structure of a schema definition for a signed document.

One schema definition 500 comprises a sextuplet of meta-schema ID 501, schema definer ID 502, schema ID 503, issuer ID 504, body structure definition 505 and schema definer signature 506 as depicted in FIG. 5.

The meta-schema ID 501 is an identifier for the structure of the schema definition, which, on the occurrence of a change in the structure of the schema definition, enables the new and old schema definitions to be distinguished from each other and hence facilitates the transition from the old to the new schema definition.

The schema definer ID 502 is an identifier of a person or organization who defines the schema. The schema ID 503 is an identifier of the schema definition 500 itself. With the schema ID 503 incorporated thereinto, the schema definition 500 is signed by the schema definer. This makes it possible to verify that, for example, even if cached on a local recording medium or received directly from the other party of a transaction, the schema definition 500 is valid for the schema ID 503.

The issuer ID 504 is to limit the issuer ID of the signed documents 200 and 410 to be defined by the schema definition. For example, in the case of defining a different schema in a plane ticket for each airline company, the identifier of the company can be specified as the issuer ID 504, but in the case of defining a common schema of a plane ticket in the airline trade, this property is not specified.

The body structure definition 505 is a part that defines properties which are required depending on the kind of an electronic ticket or certificate. In the case of a concert ticket, such properties as the date and place for the concert are defined, and in the case of a plane ticket, such properties as the departure date and the flight number are defined. These properties can freely be defined by the schema definer. Furthermore, it is defined whether these properties are each mandatory or optional, or whether a plurality of values can be specified for each property. It is also possible to concretely specify a property value that is desired to be fixed for each schema.

The schema definer signature 506 is a schema definer's signature attached to the set of meta-schema ID 501, schema definer ID 502, schema ID 503, issuer ID 504 and body structure definition 505. While in this embodiment the schema in the constraint definition part 405 has been described to be referred to using the schema ID on the precondition that the schema definition 500 is defined outside the signed document, the contents which are defined by the schema definition 500 may also be defined directly as the constraint 405.

The property value constraint 408 is to specify one or more property values in the destination document ID 412, issuer ID 413 or main body 414. This constraint is effective, for example, in additionally restricting a particular one of the property values when they cannot sufficiently be restricted by the schema definition constraint which is referred to by the schema ID constraint. This property value constraint is useful, for example, when it is desirable to specify a particular company ID as the value of the issuer ID 413 in addition to the constraint by the common schema defined by an industry trade group or similar independent organization.

FIG. 6 is a concrete example of a plane ticket expressed by the abovementioned signed document 200 (FIG. 3), and FIG. 7 is a concrete example of a value change certificate 700 that is attached as the destination document 410 (FIG. 4B) to the plane ticket 600 when its owner ID property is changed. The concrete structure of the plane ticket 600 is defined by a plane ticket schema 800 depicted in FIG. 8 but the structure is basically the same as that of the signed document 200 shown in FIG. 3; that is, the plane ticket 600 is made up of a schema ID 601, a document ID 602, an issuer ID 603, bodies 604 to 612 and an issuer signature 613. The bodies 604 to 612 have, as property definition parts, a rights type 604, a departure date 605, a flight number 606, a departure 607, a destination 608 and owner ID 609 to 612. In this example, the prepared plane ticket 600 was first an incomplete link with the owner ID property restricted by the schema ID and the property value, but afterward it was rendered to a complete link by attaching the value change certificate 700. The concrete structure of the value change certificate 700 is defined by a value change certificate schema 900 depicted in FIG. 9 but the structure is basically the same as that of the destination document 410 shown in FIG. 4B; that is, the value change certificate 700 is made up of a schema ID 701, a document ID 702, an issuer ID 703, bodies 704 to 708 and an issuer signature 709. The bodies 704 to 708 are a value 704 that is a new value, a destination document 705, a schema ID restraint 706, a property value restraint 707 and a new date 708, respectively. The value of the owner ID is interpreted as a value specified by the value 609 when the value change certificate 700 is not attached, and the value is a pair of new value 704 and new date 708 when the value change certificate 700 is attached.

In this example, by specifying the destination document ID 705 as the new value property, the value change certificate 700 forms an incomplete link with the new value property restricted by the schema ID constraint 706 and the property value constraint 707. Hence, the ticket can be further changed by attaching another value change certificate to the new value property of the value change certificate 700 (that is, by placing another value change certificate at the destination of the link specified by the destination document ID 708).

In this embodiment, the value of the schema ID of the signed document to be attached is specified as the schema ID constraints 611 and 706 to thereby restrict the schema of the signed document to be attached. Furthermore, the value of the issuer ID is specified as the property value constraints 612 and 707 to restrict the issuer ID of the signed document to be attached, thereby preventing it from being changed by an unauthorized person or organization.

The document ID's 602 and 702 are each so given as to be unique among all signed documents as mentioned previously. Such identifiers can be generated, for example, by a method of generating a universally unique identifier of the specification DCE RPC (Distributed Computing Environment Remote Procedure Call) published by the Open Group. When a plurality of signed documents forming one signed hypertext are distributed over a network, it is possible to generate, as the document ID's 602 and 702, unique identifiers by the Universal Resource Identifier (URI) specified in the World Wide Web consortium (W3C).

The destination document ID 610 (404 in FIG. 4B) is generated in advance even in the case of an incomplete link in which no destination document has been generated yet, and the destination document ID 610 is stored in the source signed document 600, which is then attached with the signature 613 (205 in FIG. 3). And, when the destination document 700 (410 in FIG. 4B) is generated, the value 610 (404) is stored as the document ID 702 (412) and the destination document 700 is attached with the signature 709

(415). With this scheme, the substitution of the destination document 700 with a signed document prepared for a different purpose is detected as invalid because of a mismatch between the values of the destination document ID 610 of the source signed document 600 and the document ID 702 of the destination signed document 700. In the case where the value change certificate 700 is made as a source signed document, too, the destination document ID 705 is similarly prepared when the destination document is likely to be generated in the future.

FIGS. 8 and 9 show examples of the schema definitions of the plane ticket 600 and the value change certificate 700, respectively. The schema definition specifies the structure of each signed document, that is, it specifies the kinds of properties required to have, values for properties that are fixed by the schema and whether properties that are not fixed by the schema are mandatory or optional.

A plane ticket schema 800 comprises, as referred to previously with reference to FIG. 5, a meta-schema ID 801, a schema definer ID 802, a schema ID 803, an issuer ID 804, bodies 805 to 810 and a schema definer's signature 811. In this embodiment, whether each property is mandatory or optional can be specified by the following four kinds of definitions. #ExactlyOne: One value must be set. #ZeroOrone: Zero or one value must be set. #OneOrMore: One or more values must be set. #ZeroOrMore: Zero or plural values must be set.

The meta-schema ID's 801 and 901 are each an identifier for the structure of the schema definition, and #System is stored as a system-defined fixed value.

A schema definition 900 of the value change certificate is assumed to be high in the frequency of use, and hence it is provided by the system in this embodiment, and the schema ID is given a special value #SysValue. This schema can also be defined by an ordinary schema definer as is the case with the plane ticket schema definition 800. In the example of the plane ticket schema 800 of FIG. 8, there is stored a plane ticket as a fixed value in the rights type 805 in the main body, and there are defined the numbers of property values to be stored in the departure date 806, the flight number 807, the departure 808, the destination 809 and the owner ID 810, respectively. In the example of the value change certificate schema 900 of FIG. 9, there are defined in the main body the numbers of property values to be stored in the new value 905 and the new date 906.

Figure 10:
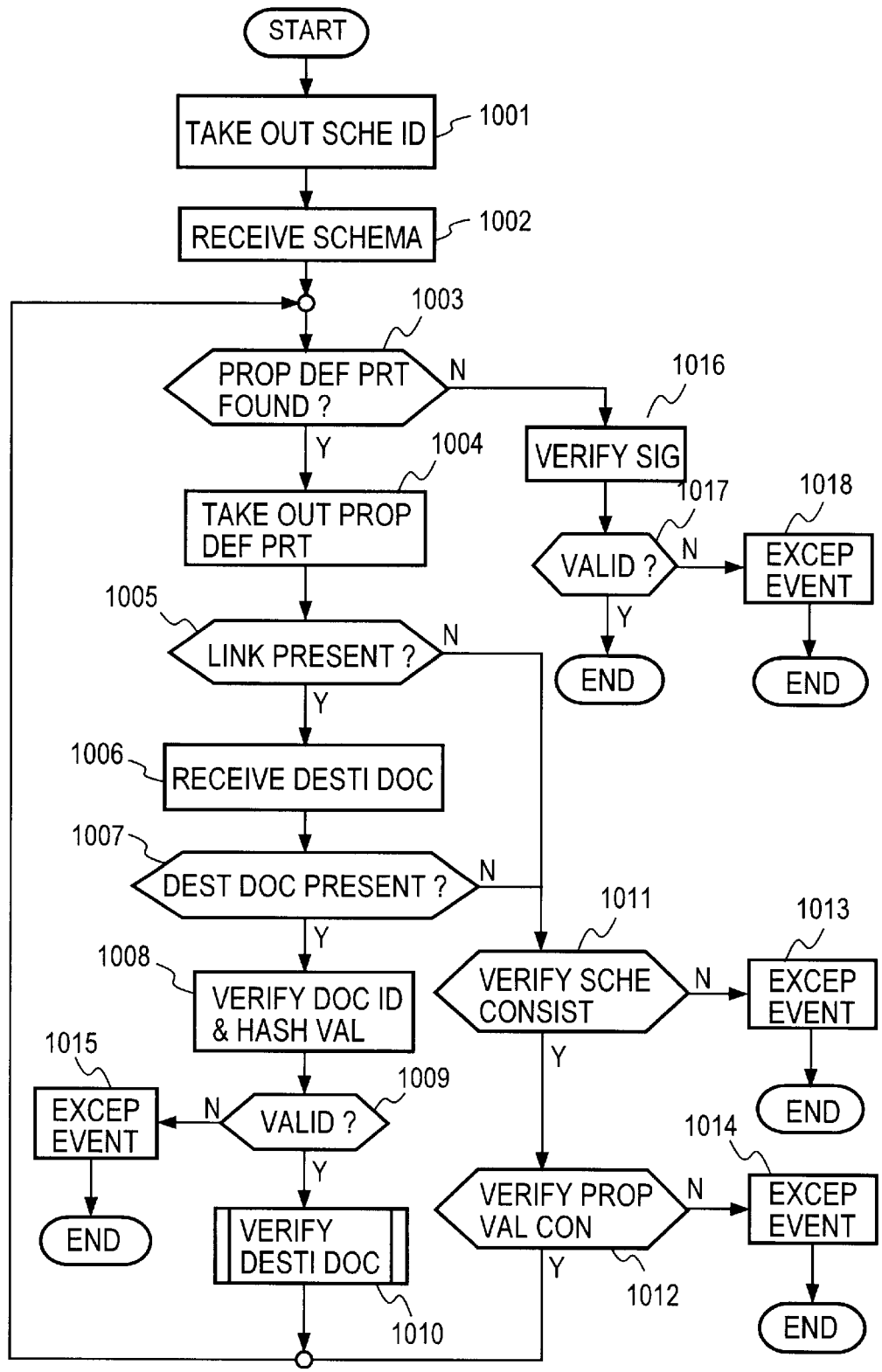
FIG. 10 is a flowchart showing how to verify the validity of the signed hypertext.

Turning next to FIG. 10, a detailed description will be given of a procedure for verifying the validity of the signed hypertext. The verification of the signed hypertext is conducted by specifying a signed document (a root signed document) with no links from other signed documents and verifying all signed documents linked from the root signed document. For example, in the hypertext 250 of FIG. 2, the signed document 200 is the root signed document.

In FIG. 10, each time the property value constraints and the schema ID constraint (specified by the schema ID) are provided which are required to be satisfied by the signed document 200 to be verified, the result of verification is output as valid (normal terminal) or invalid (abnormal termination). When the signed document to be verified is a root document, the property value constraint and schema ID constraint that are provided for the verification of the root signed document are empty.

The verification procedure begins with receiving the schema ID from the signed document 200 to be verified (step 1001). When the signed document has no schema ID property, the schema ID is used which is provided as the input for the procedure. If the both of them are specified, a check is made to see if their values are consistent with each other, and if not, an exception event is generated. If neither of them is specified, it is assumed that no constraints are placed on the document type. The schema ID is used to receive the schema (step 1002). The schema ID can be obtained, for example, by downloading it from the network through the use of an HTTP protocol or the like, or pre-caching it in a local system, or receiving it directly from the sender in the case where the signed document is circulated.

The issuer ID and the respective definition parts in the body of the signed document 200 are subjected to the process of steps 1003 to 1018 as described below.

A check is made to see if the signed document has a yet-to-be verified property definition part (step 1003).

When the yet-to-be verified property definition part is found, the process goes to step 1004 and the property definition part is taken out of the signed document 200. If no yet-to-be verified property definition part is found, the process goes to step 1016. The processing in step 1016 will be described later on.

When the property definition part is represented by a tuple of property name 302 and property value 303 as depicted in FIG. 4A (with no link), the process goes to step 1011, whereas when the property definition part is represented by a tuple of property name 402, property value 403, destination document ID 404 and constraint definition part 405 as shown in FIG. 4B (with a link), the process goes to step 1006 (step 1005). The processing in step 1011 will be described later on.

When there is a link, the destination document ID 404 is taken out from the destination document (step 1006).

When no signed document is located at the destination of the link specified by the destination document ID 404 (in the case of an incomplete link), the process goes to step 1011, whereas when the signed document is located at the destination (in the case of a complete link), the process goes to step 1008 (step 1007).

When a document is located at the destination of the link, the destination signed document 410 is obtained, and a check is made to determine if the destination document ID 404 of the source document is consistent with the document ID 412 of the destination signed document 410. When the hash value constraint 406 on the destination document 410 is provided, the hash value is calculated from the destination signed document 410 and checked for consistency with the hash constraint 406 (step 1008).

When the abovementioned conditions are not satisfied, an exception event is generated (step 1015), whereas when they are met, the process goes to step 1010 (step 1009).

Then the destination signed document 410 is verified. Step 1010 is the process itself shown in FIG. 10 and the flow of process is applied recursively to the verification of the destination signed document 410. In this instance, if the schema constraint is specified as a constraint on the destination document, the specified schema ID is provided as the input of this procedure. When a property constraints are specified, they are provided as the input of this procedure (step 1010).

When no link is found in step 1005, or when a link is found in step 1007 but no signed document is present at the destination of the link, the property value 303 or 403 in the property definition part is checked for consistency with the schema. For example, when a concrete value for that property is already defined in the schema definition obtained in step 1002, the value 303 or 403 is checked for consistency with the defined concrete value. In the case where no concrete value is defined in the schema definition but the aforementioned constraints of #ExactlyOne, #ZeroOrOne, #OneOrMore and #ZeroOrMore are specified, a check is made to see if these constraints are satisfied. If the destination signed document 410 fails these verifications, an exception event is generated (step 1013), and when the signed document passes the verifications, the process goes to step 1012 (step 1011).

When the property constraints are specified as a constraint on the source signed document, a check is made to determine whether the constraint is satisfied. If not, an exception event is generated (step 1014), whereas when the constraints are satisfied, the process goes to step 1003 (step 1012).

When no property definition part is found to be verified in step 1003, that is, when all the property definition parts 206 to 207 (FIG. 3) have been verified, the issuer signature is verified (step 1016).

If the issuer signature fails the verification, an exception event is generated (step 1018), and when the signature passes the verification, the process ends normally or returns to the main program (step 1017).

Thus, the present invention offers such advantages as listed below.

(1) One document is represented as a signed hypertext composed of a plurality of linked documents, which are each made up of a document identifier, a document issuer identifier, a document body, a destination document identifier, a constraint on the destination document, and an issuer signature attached to the document in its entirety. With this structure, a history of changes in each property of the signed document can be obtained by tracing the link attached to that property. Accordingly, the process for obtaining an ultimate or up-to-date value of each property does not involve the analysis of history of changes in other properties, and hence the entire processing can be simplified.

(2) According to the present invention, the schema of a destination document can be specified as a constraint therefor on a recording medium having recorded thereon the signed hypertext of the above structure. This permits restriction of the type of the signed document that is located at the destination of the link.

(3) According to the present invention, the value of a particular property of a destination document can be specified as a constraint therefor on a recording medium having the signed hypertext of the above structure. This permits restriction of the value of a particular property of a signed document that is located at the destination of the link. For example, by specifying the value of the issuer ID property 203, the issuer of the destination document can be restricted. Furthermore, it is also possible to freely control the state transition of an electronic ticket or contract in which values of an owner (1101), a reservation status (1102), a payment status (1103), a settlement status (1104) and other properties may vary with the processing of the signed document as will be seen from Table 1100 of FIG. 11 showing, by way of example, the signed document types, properties to be attached thereto and constraints on the attached documents. Incidentally, seals 1105 and 1106 on a contract and stamp rally paperboard can be implemented as attachments to signed documents.

(4) According to the present invention, the hash value of a destination document can be specified as a constraint therefor on a recording medium having the signed hypertext of the above structure. This prevents alterations in the destination document or its replacement with a different document. Hence, in the case of a long document like a provision of a concert ticket 1107 shown in FIG. 11, it is possible to make the document public as a signed document on the network instead of describing it directly on the electronic ticket to be circulated and to describe only the destination document ID on the electronic ticket for circulation. This permits efficient and secure transactions.

(5) The apparatus according to the present invention which creates the signed hypertext of the above structure when no destination document is instantiated at the time of defining the source document, comprises: means for generating a unique document identifier for a yet-to-be instantiated document; means for storing the unique document identifier as an identifier of a future destination document in the source document and for generating the source document; and means for generating an instantiated document using the identifier stored as the future destination document in the source document, the instantiated document being linked as a destination document to the source document. With this apparatus, it is possible to generate the signed hypertext dynamically. If a signed document prepared for a different purpose is located at the destination of the link as a substitute for the destination document, the value of the destination document ID in the source signed document does not match the value of the document ID of the substitute signed document, permitting the detection of the invalid substitution.

(6) The apparatus for verifying the signed hypertext of the above structure according to the present invention comprises: means for checking the identifier of the destination document for constituency with the destination document identifier defined in the source document; means for making a check to see if the destination document satisfies the constraints defined in the resource document; and means for verifying the signature of the issuer of each document forming the hypertext. With this apparatus, it is possible to detect, by a mechanical flow, an unreserved open plane ticket 1102, an unpaid reservation ticket 1103, a settled document 1104 with no settler's seal, a contract 1105 with no revenue stamps, a stamp-rally paperboard 1106 with no stamps affixed thereon, and so forth as depicted in FIG. 11.

In the above, the hypertext creating apparatus and the hypertext verifying apparatus also be implemented by reading out programs and interpreting and executing them by a computer.

Figure 12:
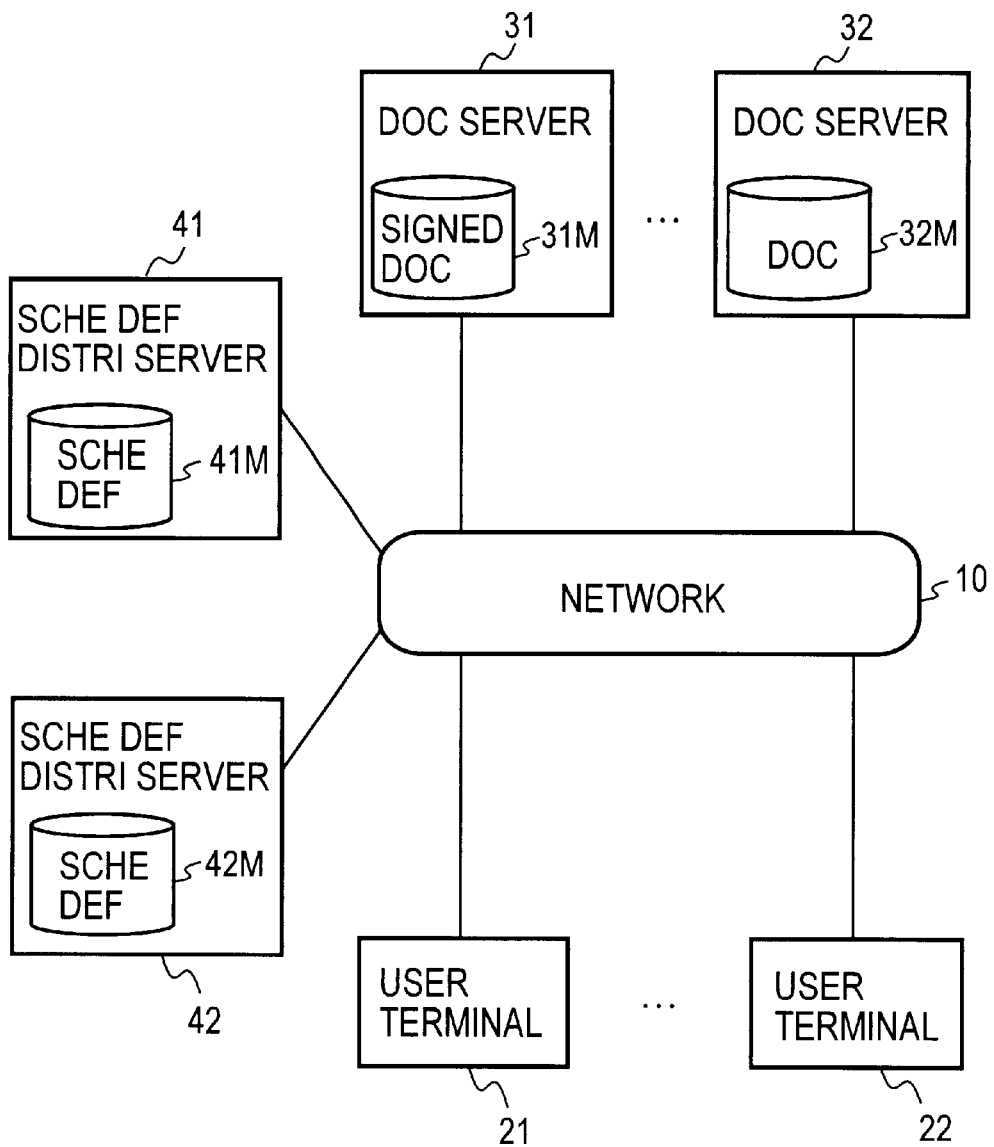
FIG. 12 is a block diagram illustrating an example of a system in which the hypertext according to the present invention is created and used.

FIG. 12 is a block diagram illustrating an example of a system in which the hypertext according to the present invention is created and used. In this example, a network 10 has connected thereto user terminals 21 and 22, schema definition distribution servers 41 and 42, and document servers 31 and 32. In schema definition memories 41M and 42M in the schema definition distribution servers 41 and 42 there are defined schemata of electronic tickets and electronic certificates in correspondence to their ID's.

Figure 13A:
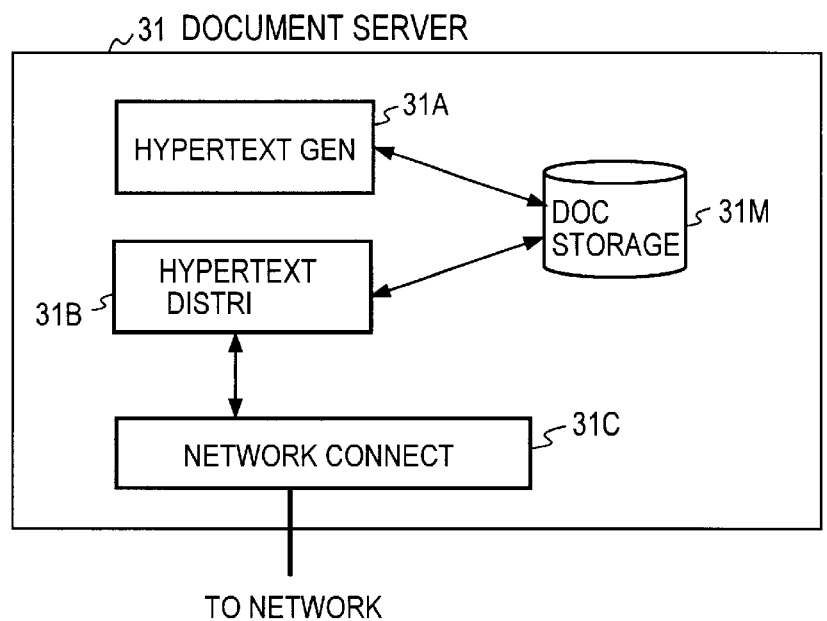
FIG. 13A is a block diagram showing an example of the configuration of a document server in FIG. 12.
Figure 13B:
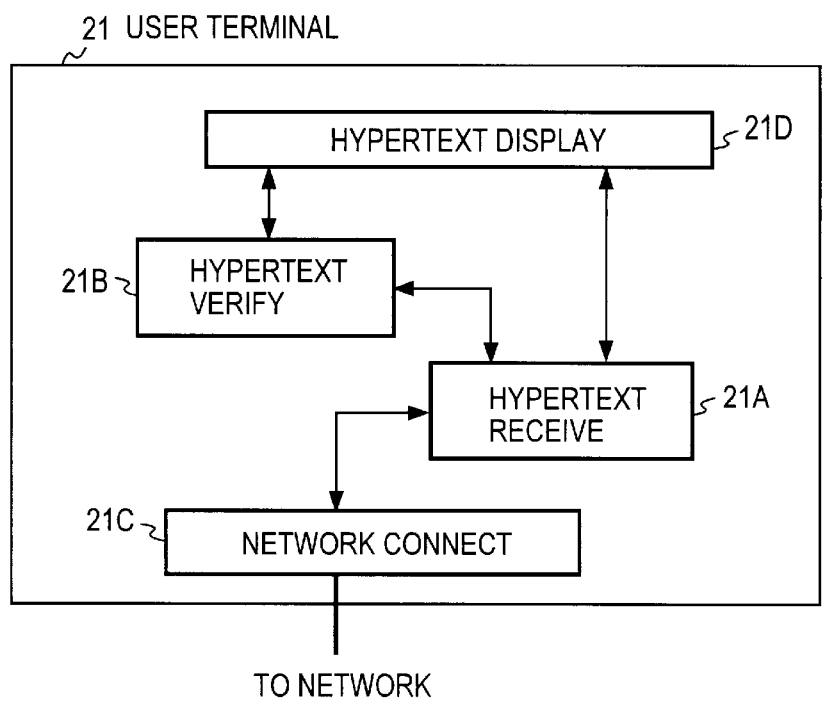
FIG. 13B is a block diagram showing an example of the configuration of a user terminal device in FIG. 12.

The document server 31 is formed by a computer, and its functional configuration comprises, as shown in FIG. 13B, a hypertext forming part 31A, a hypertext distribution part 31B, a document storage part 31M connected to them, and a network connection part 31C for connecting the hypertext distribution part 31B. The document server 32 has also the same configuration as described above. For example, a signed certificate generated by the hypertext forming part 31A as mentioned previously is stored in the document storage part 31M in correspondence to its ID, and a destination document of the certificate is sent via the hypertext distribution part 31B, for example, to the document server 32 in FIG. 12 and stored in its document storage part 32M.

The user terminal 21 is formed by a computer, and its function configuration comprises, as depicted in FIG. 13B, a hypertext receiving part 21A, a hypertext verification part 21B, a network connection part 21C, and a hypertext display part 21D. The user terminal 22 is also similarly configured. For example, on receiving a plane ticket at the user terminal 21 by the hypertext acquisition part 21A, a user displays the plane ticket on the hypertext display part 21D and verifies it by the hypertext verification part 21B following, for instance, the verification procedure of FIG. 10 stored as a program. In the verification, when there is recorded as in the plane ticket, as a destination document, a document ID having recorded therein, for example, a change in the owner, the destination document is read out, for example, from the document server 31 using the destination document ID, then the verification of the destination document is conducted, and if it is valid, the change in the owner described in the destination document is judged to be valid.

The above is merely illustrative of the present invention, and it is apparent that the invention is applicable to various other usage patterns.

EFFECT OF THE INVENTION

As described above, according to the present invention, an up-to-date value of a particular property can be obtained only by tracing the link added to the changed property. Furthermore, by defining a destination document by diverse constraints and an identifier, a schema, property values and a hash value of the document, it is possible to detect by a mechanical procedure an invalid change in the document by an unqualified person or invalid substitution of the destination document with a document prepared for a different purpose. This makes it possible to control the capability of changing a particular property in the document and to limit the type of the document that is attached while in circulation.

It will be apparent that many modifications and variations may be effected without departing from the scope of the novel concepts of the present invention.

What is claimed is:

1. A method for creating a signed hypertext made up of a plurality of linked documents, said method comprising the steps of:
    (a) forming at least one of said plurality of documents by an identifier of an issuer of said at least one document, at least one property definition part and an issuer signature attached to said at least one document in its entirety;
    (b) when said property definition part has a link, incorporating into said property definition part an identifier of a destination document and a constraint definition part for defining a constraint on said destination document;
    (c) generating a unique document identifier for a document not yet instantiated as said destination document at the time of creating a source document which is said at least one document, and incorporating said unique document identifier as a future destination document into said property definition part of said source document; and
    (d) generating said destination document with said unique document identifier when the body of said destination document is instantiated.

2. The method of claim 1, wherein said constraint on said destination document defined in said constraint definition part is a schema of said destination document which defines the document type of said destination document.

3. The method of claim 1, wherein said constraint on said destination document is a specified value of a particular property of said destination document.

4. The method of claim 1, wherein said constraint on said destination document is a hash value of said destination document.

5. A recording medium on which there is recorded, as a program for execution by a computer, a method for generating a signed hypertext made up of a plurality of linked documents in which: at least one of said plurality of documents is composed of an identifier of an issuer of said at least one document, at least one property definition part and an issuer signature attached to said at least one document in its entirety; and said at least one property definition part includes a property value, an identifier of a destination document, and a constraint definition part for defining a constraint on said destination document; said program comprising the steps of:
    (a) generating a unique document identifier for a document not yet instantiated as said destination document at the time of creating a source document which is said at least one document;
    (b) incorporating said unique document identifier as a future destination document into said property definition part of said source document; and
    (c) generating said destination document with said unique document identifier when the body of said destination document is instantiated.

6. The recording medium of claim 5, wherein said program further comprises a step of specifying, as said constraint on said destination document, a schema of said destination document which defines the document type of said destination document.

7. The recording medium of claim 5, wherein said program further comprises a step of specifying, as said constraint on said destination document, the value of a property of said destination document.

8. The recording medium of claim 5, wherein said program further comprises a step of specifying, as said constraint on said destination document, hash value of said destination document.

9. The recording medium on which there is recorded, as a program for execution by a computer, a method for verifying a signed hypertext made up of a plurality of linked documents in which: at least one of said plurality of documents is composed of an identifier of an issuer of said at least one document, at least one property definition part and an issuer signature attached to said at least one document in its entirety; and said at least one property definition part includes a property value, an identifier of a destination document, and a constraint definition part for defining a constraint on said destination document; said program comprising the steps of:
    (a) verifying whether said destination document satisfies said constraint defined in a source document which is said at least one document; and
    (b) verifying the validity of an issuer signature attached to each of said plurality of document forming said signed hypertext.

10. The recording medium of claim 9, wherein said step (a) includes a step of verifying the consistency of a schema of said destination document which defines the document type of said destination document.

11. The recording medium of claim 9, wherein said step (a) includes a step of verifying the value of a particular property of said destination document.

12. The recording medium of claim 9, wherein said step (a) includes a step of verifying a hash value of said destination document.

13. The recording medium of claim 9, wherein said program filer comprises a step of verifying whether said identifier of said destination document is consistent with a destination document identifier defined in said source document.

14. A signed hypertext generating apparatus which: forms a signed hypertext by a plurality of linked documents; forms at least one of said plurality of documents by an identifier of said at least one document, an identifier of an issuer of said at least one document, at least one property definition part, and an issuer signature attached to said at least one document in its entirety; and, when said property definition part has a link, incorporates in said property definition part an identifier of a destination document and a constraint definition part for defining a constraint on said destination document; said apparatus comprising:

means for generating a unique document identifier for a document not yet instantiated as said destination document at the time of creating a source document which is said at least one document;

means for incorporating said unique document identifier as an identifier of a future destination document into said property definition part of said source document; and means for generating said destination document with said unique document identifier when the body of said destination document is instantiated.

15. The signed hypertext generating apparatus of claim 14, which further comprises means for specifying, as said constraint on said destination document, a schema of said destination document which defines the document type of said destination document.

16. The signed hypertext generating apparatus of claim 14, which further comprises means for specifying, as said constraint on said destination document, the value of a property of said destination document.

17. The signed hypertext generating apparatus of claim 14, which further comprises means for specifying, as said constraint on said destination document, hash value of said destination document.

18. An apparatus for verifying a signed hypertext made up of a plurality of linked documents in which: at least one of said plurality of documents is composed of an identifier of an issuer of said at least one document, at least one property definition part and an issuer signature attached to said at least one document in its entirety; and said at least one property definition part includes a property value, an identifier of a destination document, and a constraint definition part for defining a constraint on said destination document; said apparatus comprising:

means for verifying whether said destination document satisfies said constraint defined in a source document which is said at least one document; and means for verifying the validity of an issuer signature attached to each of said plurality of document forming said signed hypertext.

19. The apparatus of claim 18, wherein said destination document verifying means includes means for verifying the consistency of a schema of said destination document which defines the document type of said destination document.

20. The apparatus of claim 18, wherein said destination document verifying means includes means for verifying the value of a particular property of said destination document.

21. The apparatus of claim 18, wherein said destination document verifying means includes means for verifying a hash value of said destination document.

22. The apparatus of claim 18, which further comprises means for verifying whether said identifier of said destination document is consistent with a destination document identifier defined in said source document.

* * * * *